March 5, 1957  A. CIALLIÉ ET AL  2,783,686
HYPOID GEAR CUTTING
Filed Sept. 24, 1952  4 Sheets-Sheet 1

Inventors
Arturo Ciallié
Benedetto Mammano
By Robert E. Burns
Attorney

Inventors
Arturo Ciallié
Benedetto Mammano
By Robert E. Burns
Attorney

Inventors
Arturo Ciallié
Benedetto Mammano
By Robert E. Burns
Attorney

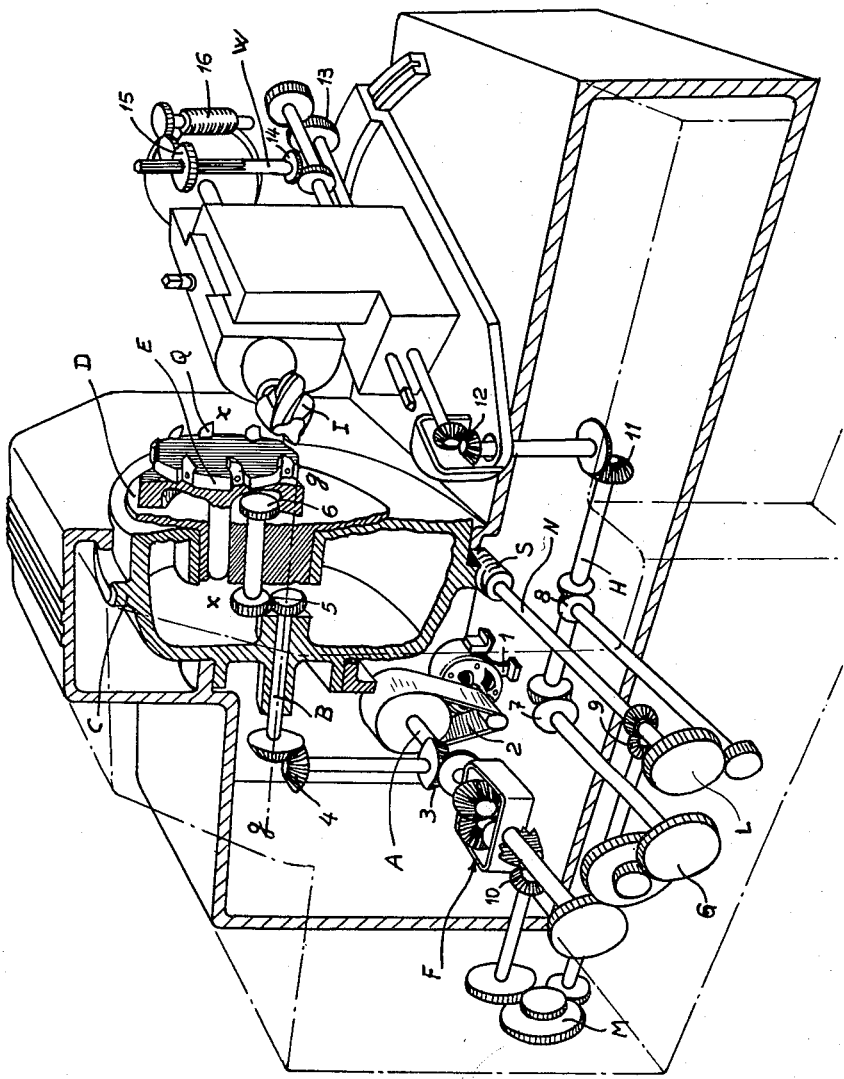

United States Patent Office 2,783,686
Patented Mar. 5, 1957

2,783,686

HYPOID GEAR CUTTING

Arturo Ciallié, Turin, and Benedetto Mammano, Milan, Italy, assignors to Fiat Società per Azioni, Turin, and Ingranaggi Mammano Società per Azioni, Milan, Italy Application September 24, 1952, Serial No. 311,254

Claims priority, application Italy September 29, 1951

5 Claims. (Cl. 90—5)

This invention relates to a method and machine of manufacturing hypoid gears with curved teeth by the continuous cutting and generating method.

Methods and machines are known for this purpose, in which the cutting and generating process is discontinuous, that is, it is fully repeated for each tooth of the gear, while by the continuous process one cutting and generating step is carried out continuously for all the teeth of the gear to be cut.

Apart from the drawbacks of discontinuity, known methods of manufacturing hypoid gears are unsatisfactory as far as accuracy and correctness are concerned, so that the owners of the machine of this kind are compelled every time to obtain from the maker of the machine data concerning the size to be given to the gears, the tools, positioning on the machines, etc., which is obviously a serious drawback. Moreover, the owner of the machine cannot vary at will the data and calculation of hypoid gears in order to secure noiselessness, which is essential in gears for the rear axle of motor vehicles, as well as a satisfactory mechanical efficiency between the gears, that is, to reduce slip between meshing teeth which, as is well known, is considerable in hypoid gears. The last mentioned drawback of present methods of manufacture is a serious one, for hypoid gears manufactured heretofore unnecessarily and excessively depart from the pitch surfaces, thereby causing objectionable slip, which it is intended to avoid by this improvement.

The object of this invention described hereafter is to manufacture extremely noiseless hypoid gears by means of a relatively simple machine, which permits a high-speed production while the improved method makes it possible to anyone to quickly predetermine all the sizes, positioning, ratios, etc. suitable for reaching the above purpose.

The invention has been developed through research work, experiments and tests dealing more particularly with hypoid gears with biased axes orthogonal to each other.

The invention concerns therefore more particularly gears having their axes arranged as just specified.

For the same reasons the invention concerns the known arrangement of the cutters rigidly fixed to the periphery of a disc and continuously rotating about the tool axis at a predetermined ratio to the continuous rotation of the gear to be cut.

Moreover, the invention is limited to the case in which the axis of the tool is kept substantially parallel with the general axis of the machine.

The invention shall now be described with reference to the accompanying drawings, wherein;

Figure 7 shows by way of example a diagram of the machine for cutting hypoid gears.

It is known to place two cones, called pitch cones, coaxially with given biased axes rotating at given speeds, and causing the said cones to roll without slipping over two distinct ideal flat wheels contained in one plane, called common plane, said wheels rotating in turn about parallel axes in the same direction but at speeds differing by a ratio $k$.

This known principle may be carried out practically in many ways, more particularly in accordance with our improved method.

Figure 1:
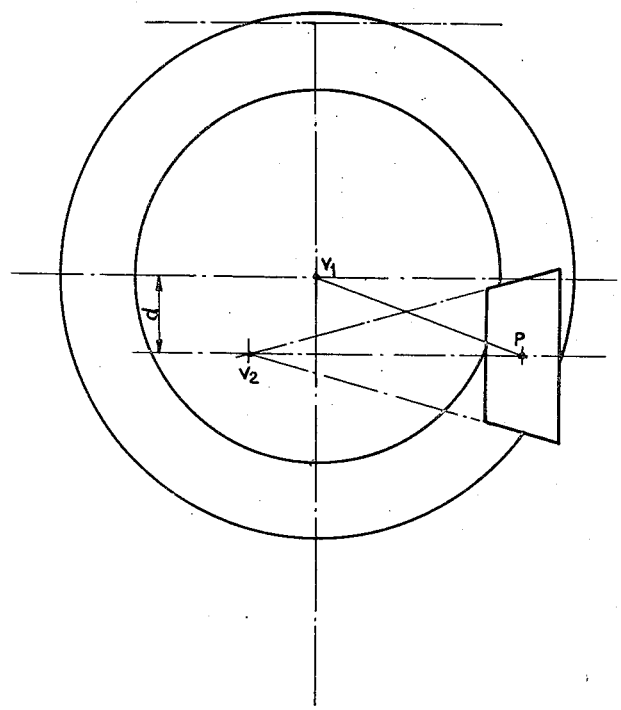
Figure 1 is a plan view of two hypoid gears with orthogonal biased axes.

Figure 1 shows two hypoid gears. The pinion axis is parallel with the plane of the drawing and is projected thereon along the straight line $V_2P$, while the wheel axis is perpendicular to the plane of the drawing and extends through the point $V_1$.

The minimum spacing between the two axes is the segment $d$.

$V_1$, $V_2$ are the apexes of two cones which are coaxial with the said biased axes.

Figure 2:
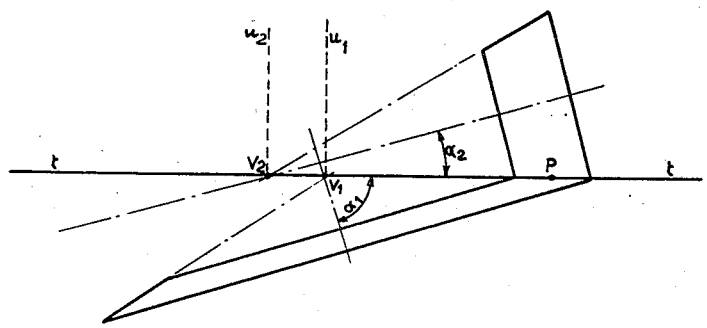
Figure 2 shows two sectional views of Figure 1 on two different vertical planes.

Figure 2 shows two special sections of Figure 1. In this Figure 2, the part beneath the straight line $t$—$t$ is the section taken in Figure 1 on a plane perpendicular to the plane of Figure 1 and extending through the straight line $V_1P$.

In Figure 2, the part above the straight line $t$—$t$ is a section taken in Figure 1 on a plane perpendicular to the plane of Figure 1 and extending through the straight line $V_2P$.

The axes of both cones are orthogonal to each other. The straight line $t$—$t$ is the track of a given plane normal to the plane of Figure 2, which is the common plane of two flat wheels of which the axes are the straight lines $V_1U_1$ and $V_2U_2$ parallel with each other. Assuming both cones are rotated about their axes at the speed selected for hypoid gears. By suitably choosing the half-angles $\alpha_1$ $\alpha_2$ on rotation the said cones roll simultaneously over the abovementioned ideal flat wheels, which rotate in turn about their axes in the same direction but at speeds differeing by a ratio $k$.

Figure 3:
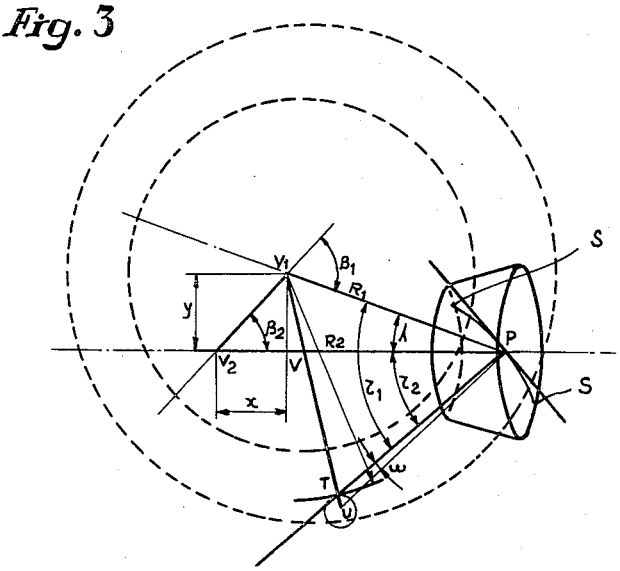
Figure 3 is a projection on a determined plane, marked in Figure 2, of the same hypoid gears.

The plane of Figure 3 is the plane $t$—$t$ of Figure 2, that is, the common plane of the two ideal flat wheels.

$V_2P$ is the generatrix along which the pinion cone and said common plane contact. $V_2P$ is as well the projection on the plane of Figure 3 of the axis of said cone, which is situated between the plane of the drawing and the observer. $V_2$ is the apex of the cone, that is, the point of intersection between the axis of the cone and the plane of Figure 3.

$V_1P$ is the generatrix along which the wheel cone contacts with said common plane, as well as the projection of the wheel axis, which is assumed to be situated beneath the plane of the drawing with respect to the observer. $V_1$ is the apex of the wheel cone, that is, the point of intersection between the cone axis and plane of Figure 3. $V_1V_2$ further are the feet of the axes normal to the plane of the drawing, about which the said flat wheels rotate in the same sense at a ratio $k$ of angular speeds, which lies preferably near each other.

Assuming $Z_1Z_2$ to denote the numbers of the teeth of the wheel and pinion, respectively, of the hypoid gears to be out and $\lambda$ the angle shown in Figure 3 between the contact generatrices, auxiliary angles $\epsilon$ $\delta$ should first be calculated, said angles being given by the following formulae:

$$\tan \epsilon = k \frac{Z_1}{Z_2} \quad (1)$$

$$\tan^2 \delta = \sqrt{0.25 + \tan^2 \lambda \sin^2 \epsilon \cos^2 \epsilon} - 0.50 \quad (2)$$

The said auxiliary angles $\epsilon$ and $\delta$ are not actually essential for the calculations but they are, however, very convenient inasmuch as they greatly simplify the mathematical elaboration of the succeeding formulae. It is known from mathematics that any number can be defined as the tangent function of a certain angle or as a power of a tangent so that, in carrying out calculations, the trigonometric tangent of a certain angle appears instead of a fraction or the like. In this case, in order to avoid transcribing in the course of the specification the second members of the formulae 1 and 2, the values of these second members have been briefly expressed as $\tan \epsilon$ and $\tan^2 \delta$, respectively.

The angles $\alpha_1$ $\alpha_2$, respectively, of the wheel and pinion can be reckoned by means of $$\sin \alpha_1 = \cos \delta \sin \epsilon \quad (3)$$

$$\sin \alpha_2 = \cos \delta \cos \epsilon \quad (4)$$

Upon correct calculation, the result should be $$\tan \alpha_1 \tan \alpha_2 = \cos \lambda \quad (5)$$

Upon these assumption, our improved method mainly consists in cutting and generating the teeth of hypoid gears continuously and simultaneously on both flanks of each tooth space, by arranging the common plane of the two flat wheels normal to the general axis of the machine and bringing the latter into register with the axis of the flat wheel corresponding to the wheel, that is, extending through the point $V_1$. Moreover, the pitch cones of the pinion and wheel are situated tangentially of said common plane of the machine, with a spacing of their apexes corresponding to the hypothenuse of the right triangle $V_1VV_2$, of which the perpendicular sides $V_2V$ and $V_1V$ are of the lengths X and Y reckoned by the Formulae 18 and 19 herein. The pinion axis is arranged on the machine on a horizontal plane, so that its projection on the said common plane is vertically displaced with respect to the generic axis of the machine by the said extent Y.

The above described arrangements are essential and distinguish our improved method, but should be completed by the following remarks.

The ratio between the number of revolutions of the tool and gear blank to be cut, respectively, is selected in such manner that during one turn of the tool the blank performs a rotation by one or more steps according to the number of the sets of finishing and rough cutters with which the tool is equipped. Assuming, by way of example, that the tool comprises three sets of cutters and each set includes two finishing cutters, for producing the convex toothed surface and concave toothed surface, respectively, as well as some rough cutters adapted to remove the metal in the space between two contiguous teeth, the cutters of all the three sets are angularly and radially positioned in a known manner. Therefore, each of the three sets travels merely through one tooth space only and during one turn of the tool the blank is rotated through three steps, that is, by a number of steps equalling the number of the abovementioned cutter sets in the tool.

Referring to Figure 3, the axis normal to the plane of the figure and extending through $V_1$ is the generic machine axis. The tool axis is likewise normal to the plane of the drawing, that is, it is parallel with the generic axis of the machine and extends through the point U. The radius of the tool is UP, so that the longitudinal curve of the teeth would be the circular arc SPS assuming the blanks were stationary as the tool rotates.

Actually, since the blank is also continuously rotated, the arc SPS described on the rim face of the flat wheel, is an elongated epicycloid arc, provided the flat wheel and tool are counter rotated, or an elongated hypocycloid arc in the opposite case. The said curves are elongated, because their generating point P lies outside the circle having a radius UT which rolls without slipping on the circle having a radius $V_1T$ in the case of epicycloidal curves.

The ratio $$\frac{V_1T}{UT}$$

equals the ratio between the angular speed of the tool and the speed of the flat wheel having its center at $V_1$.

These peculiar characteristics of epi-hypo-cycloidal curves are known and need not be described in greater detail. It will be recalled that the straight line TP connecting the generating point P with the point T at which the rolling circle having a radius UT contacts the base circle having a radius $V_1T$ is the line normal to the epicycloidal curve SPS at the point P, the latter curve being the longitudinal tooth curve.

The consequence is that the angles $\tau_1$ $\tau_2$ shown in Figure 3 are the complements of the known spiral angles of the wheel and pinion teeth.

It will be seen from Figure 3 that the contact generatrices $V_1P$ and $V_2P$ of the pitch cones of the wheel and pinion on the common plane of the ideal flat wheels form the angle $\lambda$, which is the difference between the desired spiral angles of the wheel and pinion. Assuming a spiral angle of the wheel and pinion of 31° 26' and 50° 0', respectively, results:

$\tau_1 = 90° - 31° 26' = 58° 34'$
$\tau_2 = 90° - 50° 0' = 40° 0'$
$\lambda = 50° - 31° 26' = 58° 34' - 40° = 18° 34'$.

According to our improved method the angles are assumed to be given together wtih $d$ $Z_1Z_2k$.

After calculating the angles $\alpha_1\alpha_2$ by means of the formulae given above, the number M is calculated, which is given by $$M = \frac{\sin \tau_1}{\sin \tau_2} \frac{Z_2}{Z_1} \cos \alpha_1 + \cos \alpha_2 \quad (6)$$

The pitch radius $r_1$ of the wheel tangential at the point P can be readily calculated by the formula:

$$r_1 = \frac{d}{M \sin \lambda} \quad (7)$$

The number F is now calculated, which is given by $$F = \frac{\sin \tau_1}{\sin \tau_2} k \quad (8)$$

The angle $\beta_2$ marked in Figure 3 is obtained by the formula $$\cotan \beta_2 = \frac{F - \cos \lambda}{\sin \lambda} \quad (9)$$

while $$\beta_1 = \beta_2 + \lambda \quad (10)$$

The essential spacing $c = V_1V_2$ is given by the formula:

$$c = \frac{d}{\sin \beta_1 \cos \alpha_1 \sin \beta_2 + \sin \alpha_2 \cos \alpha_2 \sin \alpha_1} \quad (11)$$

from which we derive:

$$V_1P = R_1 = \frac{c}{\sin \lambda} \sin \beta_2 \quad (12)$$

$$V_2P = R_2 = \frac{c}{\sin \lambda} \sin \beta_1 \quad (13)$$

The pitch radii $r_1$ of the wheel and $r_2$ of the pinion are both tangential of the point P and are given by the formulae $$r_1 = R_1 \sin \alpha_1 \quad (14)$$

$$r_2 = R_2 \sin \alpha_2 \quad (15)$$

Upon correct calculation, the value $r_1$ reckoned by the Formula 7 should equal the value reckoned by the Formula 14.

From the standpoint of the gear size, the essential elements, namely the half-angles $\alpha_1 \alpha_2$ and lengths $R_1 R_2$ of the contact generatrices comprised between the apexes of the cones and the point P of intersection between said generatrices, are reckoned by the Formulae 3, 4, 12, 13 as a function of the numbers of teeth $Z_1 Z_2$, of the minimum spacing $d$ of the axes, and of the ratio $k$ between the speeds of the coplanar ideal flat wheels, as well as a function of the desired spiral angles of the wheel and pinion teeth, from which the angle $\lambda$ also is derived.

Instead of previously setting the ratio $k$, it is possible in certain cases to set the half-angle of the pitch cone of the wheel together with the spiral angles of the wheel and pinion teeth, from which the angle $\lambda$ is promptly derived.

In this case the angle $\alpha_2$ is reckoned by means of the Formula 5, whereupon the angle $\epsilon$ is calculated by means of the formula $$\tan \epsilon = \frac{\sin \alpha_1}{\sin \alpha_2}$$

Finally, $k$ is calculated by means of Formula 1. The previous calculation scheme is then fully repeated. In other words, the angle $\alpha_2$ of the pitch cone of the pinion as well as the lengths $R_1 R_2$ of the contact generatrices confined by the apexes of said cones and the point of intersection of said generatrices and the ratio $k$ between the speeds of the coplanar ideal flat wheels are determined by means of the Formulae 5, 16, 1, 12, 13 as a function of the spiral angles of the teeth, minimum spacing $d$ of the axes, number of teeth of the gears as well as half-angle of the pitch cone of the wheel.

It may at times be practically required for the pitch radius $r_1$ of the wheel to be as small as possible consistently with the size in view. It is essential to establish the manner of calculating this minimum value. A mathematic lowest value exists, which is found in the following manner.

A value $\alpha_1$, is established at will, whereupon the corresponding value of $\alpha_2$ is determined by means of the Formula 5, assuming the angle $\lambda$ is included among the previously set values; moreover, the spiral angles and numbers of teeth $Z_1 Z_2$ are determined. The value of M corresponding to the value set for $\alpha_1$ is reckoned by means of the Formula 6. By conveniently varying $\alpha_1$ various values of M are found and it will be seen that with a certain value of $\alpha_1$, M takes a maximum value, to which the mathematic minimum value of $r_1$ corresponds by virtue of the Formula 7.

A quick method of reckoning the value $r_1$ but slightly exceeding the mathematic minimum value consists in assuming $k$ reckoned by the formula $$k = 1 - \frac{\tan \lambda}{\tan \alpha_1} \quad (17)$$

By following the above described calculating method, a value $r_1$ is found which but slightly exceeds the mathematic minimum value. This means that the ratio $k$ or the half-angle of the pitch cone of the wheel are set in such manner that the radius of the circular section of the wheel which is tangential of the point of intersection of the contact generatrices equals or but slightly exceeds the minimum value consistent with the size in view.

It is practically essential to reduce as far as possible slipping between the teeth of hypoid gears. The purpose is reached by assuming the ratio $k$ as near as possible to the unit. It is immaterial whether the ratio is slightly above or below one.

Figure 3 clearly shows that the perpendicular sides of the rectangular triangle $V_1 V V_2$ are given by $$x = V_2 V = c. \cos \beta_2 \quad (18)$$
$$Y = V_1 V = C. \sin \beta_2 \quad (19)$$

wherein $c$ is calculated by means of the Formula 11 and the further preceding formulae, while $\beta_2$ is calculated by means of the Formula 9.

Figure 4:
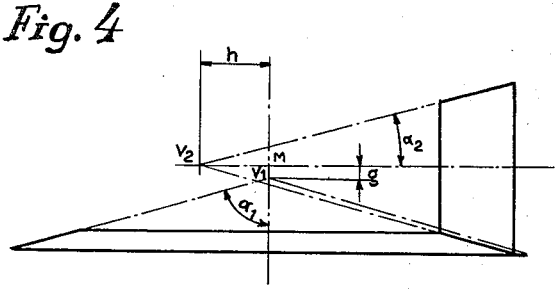
Figure 4 shows the manner of assembling the gears.

Figure 4 shows the device for the assembly of the intermeshing gears. The point M is the projection of the smallest spacing of the orthogonal axes of the gears. The spacings $h = MV_2$ and $g = MV_1$ of the apexes of the pitch cones and the foot M of the smallest distance are characteristic values. These distances are determined by means of the following formulae:

$$MV_2 = h = c. \cos \alpha_2 \cos \beta_2 \quad (20)$$
$$MV_1 = g = c. \cos \alpha_1 \cos \beta_1 \quad (21)$$

Figure 5:
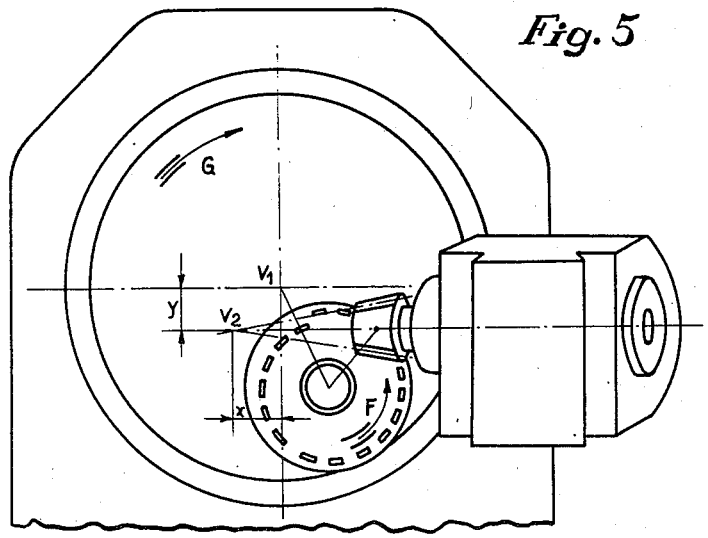
Figures 5 and 6 show two devices for positioning the gears to be cut on the machine.
Figure 6:
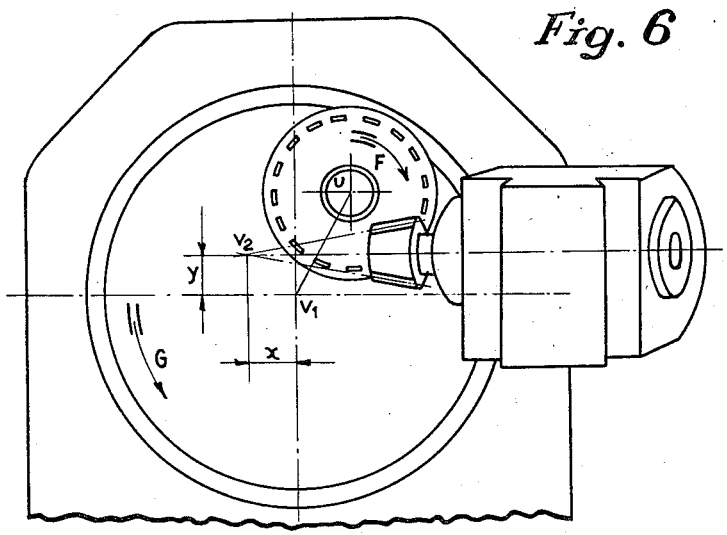

Figures 5 and 6 substantially transfer to the machine the scheme shown in Figure 3. The axis extending through $V_1$ perpendicular to the plane of Figures 5 and 6 is the generic axis of the machine.

The point U is the center of the tool through which the tool axis extends, said axis being and keeping parallel with generic axis of the machine. The tool rotates as shown by the arrow F.

The blank, not shown in Figures 5 and 6, is arranged with its apex at the point $V_1$ and tangential of the common plane of the ideal flat wheel, the blank being cut and generated like a conventional bevel gear.

The pitch cone of the pinion is arranged, again tangential of said common plane, so that its apex $V_2$ is displaced with respect to $V_1$ according to X and Y given by the Formulae 18 and 19, forestalling that the pinion axis is vertically displaced downwards (Figure 5) or upwards (see Fig. 6) with respect to the horizontal line extending through $V_1$, depending upon whether the centers of curvature of the sets of teeth should be low or high. Consequently, the axis of the blank may be displaced in the machine below or above the generic axis of the machine by means of vertical carriage, partly visible in Figures 5 and 6, provided in the support, the blank being rotated by means of gearings including a splined vertical shaft. In order to produce intermeshing toothed surfaces, the tool is rotated together with its axis about the center $V_1$, both for cutting the wheel and pinion.

Rotation of the tool axis about the center $V_1$ may be to the right or to the left.

The arrows denoted by G in Figures 5 and 6 show the sense of rotation of the ideal flat wheels having center $V_1$ and $V_2$ which, in the more frequent case of epicycloidal curves, rotate oppositely to the tool.

Figure 7 shows diagrammatically a machine adapted to cut hypoid gears with curved teeth by the continuous cutting and generating process according to the above described method.

The motor 1 rotates by means of belts 2 the shaft A. Motion, which is continuous throughout the machine, is transmitted over the pairs of bevel wheels 3 and 4 to the shaft B, of which the axis $g$—$g$ is the horizontal generic axis of the machine. The tool E is rotated by means of the pairs of spur gears 5, 6, said tool consisting of a disc having peripherally attached thereto the cutters Q, which rotate continuously about the axis $xx$ of the tool according to a predetermined ratio to the likewise continuous rotation of the blank.

Motion is transmitted from abovementioned shaft A over the differential gear F, of which the function shall be described hereafter, and the two pairs of interchangeable gears G arranged externally of the machine, the pairs of toothed wheels 7 and 8 mounted on the shaft H and pair of spur gears L likewise arranged externally of the machine, to the worm S keyed to the shaft N which rotates the large drum C about the generic axis of the machine, carrying along the tool which further rotates about its axis $x$—$x$.

The tool axis is and keeps parallel during the full cutting and generating process with the generic axis $g$—$g$ of the machine.

The abovementioned shaft N transmits its motion through the pair of bevel wheels 9 and the rolling set M, or set of four interchangeable gears arranged externally of the machine, as well as through the pair of bevel wheels 10 to the cage of the differential gear F in order to vary rotation of the blank when the large tool-carrier drum rotates about the machine axis $g$—$g$. If the large drum is kept stationary, the cage of the differential gear F also keeps stationary and the abovementioned shaft H transmits its motion through gears 11, 12, 13, 14, 15, 16 to the blank I to be cut. If the large drum is rotated, the differential gear modifies rotation of the blank in order to obtain the necessary rolling between the tool representing the ideal wheel and the blank. In Figure 7 the axis of the blank is vertically displaceable and is rotated by means of gear including the vertical splined shaft W.

In order to obtain conjugated toothed surfaces of the pinion and wheel, the tool employed for cutting the pinion is the specular image of the tool employed for cutting the wheel, the two tools and blanks, respectively, being counter rotated.

In cutting hypoid gears the spacing of the tool center U to the center $V_1$, that is, the eccentricity $e = UV_1$ of the tool, see Figure 3, is essential.

With this object in view, the angle $\omega$ marked in Figure 3 should first be determined by means of the formula $$\sin \omega = \frac{r_1 \sin \tau_1}{\rho z_1}$$

in which $\rho$ is the radius of the tool, that is $\rho = UP$. Consequently, $$e^2 = R_1^2 + \rho^2 - 2\rho R_1 \cos(\tau_1 + \omega) \qquad (23)$$

Upon freely setting the tool radius suitable for cutting the pinion and wheel, the eccentricity of the tool is calculated by means of the Formulae 22 and 23. The spacing of the tool axis and generic machine axis remains unaltered in cutting the wheel or pinion.

In describing the machine it has been explained that the rolling set M is composed of four interchangeable gears. The ratio $q$ of these gears remains unvaried in cutting the wheel or pinion and is calculated by means of the following formula:

$$q = \frac{c}{n . \sin \alpha_1} \qquad (24)$$

in which $n$ is a fixed constant for each machine supplied by the maker. Usually the ratio $q$ is not accurately obtainable by means of four series gears. However, provision is made for selecting and calculating the angle $\alpha_1$ of the pitch cone of the wheel in such manner that the ratio $q$ is accurately obtained by means of four series gears.

For the sake of clearness, the following calculation is given by way of example:

$Z_1 = 35$ $Z_2 = 8$ $d =$ mm. 23 $\tau_1 = 58°\ 34'$ $\tau_2 = 40°\ 0'$

We assume $k = 0.85$. Consequently $\lambda = 18°\ 34'$

By applying (1) we obtain $\epsilon = 74°\ 56'\ 56''$
By applying (2) we obtain $\delta = 5°\ 4'\ 45''$
By applying (3) we obtain $\alpha_1 = 74°\ 13'\ 10''$
By applying (4) we obtain $\alpha_2 = 14°\ 59'\ 50''$
By applying (6) we obtain $M = 1.048451$
By applying (7) we obtain $r = 68.896$
By applying (8) we obtain $F = 1.128305$
By applying (9) we obtain $\beta_2 = 60°\ 28'\ 20''$
By applying (10) we obtain $\beta_1 = 79°\ 2'\ 20''$
By applying (11) we obtain $c = 26.139$
By applying (12) we obtain $R_1 = 71.595$
By applying (13) we obtain $R_2 = 80.781$
By applying (14) we obtain $r_1 = 68.896$
By applying (15) we obtain $r_2 = 20.904$
By applying (18) we obtain $X = 12.912$
By applying (19) we obtain $Y = 22.796$
By applying (20) we obtain $h = 12.472$
By applying (21) we obtain $g = 1.355$
By applying (22) we obtain $\omega = 1°\ 4'\ 9''$
By applying (23) we obtain $e = 81.923$
By applying (24) we obtain for $n = 75$ $q = 0.484943$ When $q = 0.484$ is desired, the values of $Z_1 Z_2 d$ being the same, Formula 24 gives $\alpha_1 = 74°\ 37'\ 11''$ and we obtain by means of Formula 5 $\alpha_2 = 14°\ 36'\ 53''$. By applying the above explained calculating method, the result is

| | | |
|---|---|---|
| $k = 0.87343$ | $r_1 = 68.918$ | $x = 15.115$ |
| $F = 1.159414$ | $\beta_1 = 74°\ 58'\ 40''$ | $g = 1.878$ |
| $c = 27.321$ | $R_2 = 32.873$ | $Y = 22.759$ |
| $M = 1.048115$ | $r_2 = 20.910$ | $\omega = 1°\ 4'\ 11''$ |
| $\beta_2 = 56°\ 24'\ 40''$ | $h = 14.625$ | |
| $R_1 = 71.478$ | $e = 81.923$ | |

What we claim is:

1. A method of manufacturing a pair of intermeshing hypoid gears comprising a wheel and a pinion having axes which are biased and orthogonal to each other by a continuous generating process employing a cutting tool including a plurality of cutters secured in a peripheral zone of a disc adapted to undergo a revolving motion about the main axis of the machine, which comprises, cutting the wheel by the steps which comprise, positioning a wheel blank with its axis obliquely intersecting the main axis on the pitch plane of the tool, effecting a continuous rotation of the tool and blank about their axes while causing the axis of the tool to revolve parallel to and about said main axis at a fixed distance therefrom and while causing the cutters to engage the blank and simultaneously cut and generate two flanks of each tooth space, and cutting the pinion by the steps which comprise positioning a pinion blank with its axis obliquely intersecting the pitch plane of the tool at a distance off-set from the main axis of the machine, the off-set distance being different from the bias-distance between the axes of the wheel and pinion in their eventual assembled position, effecting a continuous rotation of the tool and blank about their axes while causing the axis of the tool to revolve parallel to and about said main axis of the machine at said fixed distance therefrom and while causing the cutters to engage the blank and simultaneously cut and generate two flanks of each tooth space.

2. A method of manufacturing a pair of intermeshing hypoid gears comprising a wheel and a pinion having axes which are biased and orthogonal to each other by a continuous generating process by employing a cutting tool including a plurality of cutters secured in a peripheral zone of a disc adapted to undergo a revolving motion about the main axis of the machine, which comprises, cutting the wheel by the steps which comprise positioning a wheel blank with its axis positioned on a horizontal plane and intersecting the main axis on the pitch plane of the tool and with its intended pitch cone tangential to said plane, effecting a continuous rotation of the tool and blank about their axes while causing the axis of the tool to revolve parallel to and about said main axis at a fixed distance therefrom and while causing the cutters to engage the blank and simultaneously cut and generate two flanks of each tooth space and cutting the pinion by the steps which comprise positioning a pinion blank with its axis obliquely intersecting the pitch plane of the tool at a point off-set from the main axis by a distance having both a horizontal and a vertical component, the off-set distance being different from the bias-distance between the axes of the wheel and pinion in their eventual assembled position, effecting a continuous rotation of the tool and blank about their axes while causing the axis of the tool to revolve parallel to and about said main axis of the machine at said fixed distance therefrom and while causing the cutters to engage the blank and simultaneous cut and generate two flanks of each tooth space.

3. In a method as defined in claim 2, in the wheel blank positioning step, the step of positioning the blank with its intended pitch cone tangential to the pitch plane of the tool along a contact generatrix, and in the pinion blank positioning step, the step of positioning the blank with its intended pitch cone tangential to the pitch plane of the tool and with the contact generatrix of the cone inclined with respect to said contact generatrix on an angle which is equal to the difference between the desired spiral angles of the wheel and pinion teeth.

4. A method as defined in claim 1, wherein the off-set distance is a function of the bias distance between the biased axes of the wheel and pinion in their eventual position according to the formula:

$$c = \frac{d}{\sin \beta_1 \cos \alpha_1 \sin \beta_2 + \sin \alpha_2 \cos \alpha_2 \sin \alpha_1}$$

wherein $c$ is the off-set distance,
$d$ is the bias distance,
$\alpha_1$ is a half-angle of the pitch cone of the pinion,
$\alpha_2$ is a half-angle of the pitch cone of the wheel,
$\beta_1$ and $\beta_2$ are angles resulting from the formulae:

$$\beta_1 = \beta_2 + \lambda$$

$$\cotan \beta_2 = \frac{F - \cos \lambda}{\sin \lambda}$$

$$F = k \frac{\sin \tau_1}{\sin \tau_2}$$

wherein $\lambda$ is the difference between the spiral angles of the pinion and wheel, respectively,
$k$ is a ratio between angular speeds of the crown wheels relative to the pinion and wheel,
$\tau_1$ and $\tau_2$ are complements to 90° of the spiral angles of the pinion and wheel, respectively.

5. A method as defined in claim 2, wherein said horizontal and vertical components are given by formulae:

$$x = \frac{d \cos \beta_2}{\sin \beta_1 \cos \alpha_1 \sin \beta_2 + \sin \alpha_2 \cos \alpha_2 \sin \alpha_1}$$

$$y = \frac{d \sin \beta_2}{\sin \beta_1 \cos \alpha_1 \sin \beta_2 + \sin \alpha_2 \cos \alpha_2 \sin \alpha_1}$$

wherein $x$ is the horizontal component,
$y$ is the vertical component,
$d$ is the bias distance between the biased axes of the wheel and pinion,
$\alpha_1$ is a half-angle of the pitch cone of the pinion,
$\alpha_2$ is a half-angle of the pitch cone of the wheel,
$\beta_1$ and $\beta_2$ are angles resulting from the formulae $$\beta_1 = \beta_2 + \lambda$$

$$\cotan \beta_2 = \frac{F - \cos \lambda}{\sin \lambda}$$

$$F = k \frac{\sin \tau_1}{\sin \tau_2}$$

wherein $\lambda$ is the difference between the spiral angles of the pinion and wheel, respectively,
$k$ is a ratio between angular speeds of the crown wheels relative to the pinion and wheel,
$\tau_1$ and $\tau_2$ are complements to 90° of the spiral angles of the pinion and wheel, respectively.

References Cited in the file of this patent
UNITED STATES PATENTS

| | | |
|---|---|---|
| 1,969,843 | Head | Aug. 14, 1934 |
| 2,070,191 | Wildhaber | Feb. 9, 1937 |
| 2,339,375 | Cassel | Jan. 18, 1944 |
| 2,354,181 | Carlsen et al. | July 25, 1944 |
| 2,444,551 | Bauer | July 6, 1948 |